(12) United States Patent
Petts et al.

(10) Patent No.: US 9,639,877 B1
(45) Date of Patent: May 2, 2017

(54) EBOOK CITATION ENHANCEMENT

(75) Inventors: James C. Petts, Redmond, WA (US); Aaron James Dykstra, Federal Way, WA (US); Laura Ellen Grit, Seattle, WA (US); Lindsey Christina Fowler, Seattle, WA (US); Dennis H. Harding, Bothell, WA (US); George M. Ionkov, Seattle, WA (US); Samuel A. Minter, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 781 days.

(21) Appl. No.: 13/543,094

(22) Filed: Jul. 6, 2012

Related U.S. Application Data

(63) Continuation-in-part of application No. 12/910,683, filed on Oct. 22, 2010.

(51) Int. Cl.
G06Q 30/00 (2012.01)
G06F 17/30 (2006.01)
G06Q 30/06 (2012.01)

(52) U.S. Cl.
CPC .................... *G06Q 30/0623* (2013.01)

(58) Field of Classification Search
CPC .................................. G06Q 30/0634
USPC ................................ 705/26.1–27.2
See application file for complete search history.

(56) References Cited

U.S. PATENT DOCUMENTS

| | | | |
|---|---|---|---|
| 7,483,846 B1 * | 1/2009 | Kumar et al. | 705/26.43 |
| 2002/0007322 A1 | 1/2002 | Stromberg | |
| 2003/0001873 A1 | 1/2003 | Garfield et al. | |
| 2004/0141016 A1 | 7/2004 | Fukatsu et al. | |
| 2006/0218492 A1 | 9/2006 | Andrade | |
| 2007/0106794 A1 | 5/2007 | Manber et al. | |
| 2008/0229182 A1 * | 9/2008 | Hendricks et al. | 715/205 |
| 2009/0043674 A1 * | 2/2009 | Minsky et al. | 705/27 |
| 2009/0182622 A1 | 7/2009 | Agarwal et al. | |
| 2009/0222368 A1 | 9/2009 | McCauley et al. | |
| 2011/0022500 A1 * | 1/2011 | Scheinfeld et al. | 705/27.2 |
| 2012/0143590 A1 | 6/2012 | Ajima | |

OTHER PUBLICATIONS

Nesbit, K. (1990). BRS/Links to the future: Online hypertext is born. Online, 14(3), 34. Retrieved from http://search.proquest.com/docview/199929743?accountid=14753.*

Non-Final Office Action for U.S. Appl. No. 12/910,683, mailed on Sep. 24, 2012, James C. Petts et al., "eBook Citation Enhancement", 24 pages.

Final Office Action for U.S. Appl. No. 12/910,683, mailed on Feb. 22, 2013, James C. Petts et al., "eBook Citation Enhancement", 31 pages.

Office action for U.S. Appl. No. 12/910,683, mailed on Nov. 13, 2014, James C. Petts, "eBook Citation Enhancement", 29 pages.

(Continued)

*Primary Examiner* — Kathleen Palavecino
(74) *Attorney, Agent, or Firm* — Lee & Hayes, PLLC

(57) ABSTRACT

Electronic content items such as electronic books are enhanced by identifying citations within the content items, identifying sources of the objects of the citations, and associating the citations with such sources so that readers of the content items can easily purchase or otherwise obtain the citation objects. The citations may be updated as new products become available or information related to the products changes over time.

26 Claims, 9 Drawing Sheets

(56) References Cited

OTHER PUBLICATIONS

Final Office Action for U.S. Appl. No. 12/910,683, mailed on Apr. 15, 2015, James C. Petts, "eBook Citation Enhancement", 33 pages.
Office Action for U.S. Appl. No. 12/910,683, mailed on May 23, 2016, Petts et al., "eBook Citation Enhancement", 32 pages.
Office action for U.S. Appl. No. 12/910,683, mailed on Oct. 20, 2016, Petts et al., "eBook Citation Enhancement", 36 pages.

* cited by examiner

EBOOK CITATION ENHANCEMENT

RELATED APPLICATION

This application is a continuation-in-part of and claims the benefit of U.S. patent application Ser. No. 12/910,683, entitled "eBook Citation Enhancement," filed on Oct. 22, 2010, which is incorporated by reference herein in its entirety.

BACKGROUND

Digital content such as electronic books ("eBooks") have undergone tremendous growth. Devices such as eBook readers and ubiquitous smart phones bring reading content to large numbers of users, and many users have transitioned nearly entirely away from paper-based reading content.

In achieving this level of popularity, existing devices and technologies have largely concentrated on replicating the look and feel of traditional paper-based books and magazines. However, electronic viewing and communications technologies open new possibilities for enhancing text-based content and for adding functionality and supplemental information to the content itself.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Content item consumers, referred to herein as readers or users, may access and render electronic books ("eBooks") using a wide variety of electronic devices, such as electronic book reader devices, smartphones, personal digital assistants (PDAs), portable media players, desktop computers, portable computers, tablet computers, and so forth. These devices often have network connectivity, either wired or wireless, allowing them to remotely access and retrieve electronic content from online sources such as electronic booksellers and websites. Content items corresponding to written physical media, such as books and magazines, are available in this manner for consumption by users of electronic book reader devices.

Described herein are various techniques to enhance digital content items such as eBooks. In particular, techniques for enhancing citations in eBooks are described. Such techniques include identifying citations in eBooks and associating the citations with online sources of the content referenced by the citations. If, for example, an eBook contains a citation to a scholarly paper that is available from an online source, the citation in the eBook is electronically associated with that source so that a reader can easily find and obtain the scholarly paper when reading the eBook. In some cases, the cited content may be available at no charge. In other cases, the cited content may consist of other books or papers that are available for purchase. Making it easier for a reader to locate the source of a cited work may enhance the experiences of readers, while also leading to additional online sales opportunities. In some embodiments, the citations may have content that is currently unavailable from a source. These citations may be updated after the content becomes available from the source. In various embodiments, a service may notify a customer when the content becomes available. The service may also store the citations from an eBook, store selected citations from the eBook, and/or track purchases for revenue sharing based on access via the citations.

Illustrative Environment

Figure 1:
FIG. 1 is a block diagram of an illustrative architecture configured to provide enhanced electronic content items to users of eBook reader devices.
Figure 1:
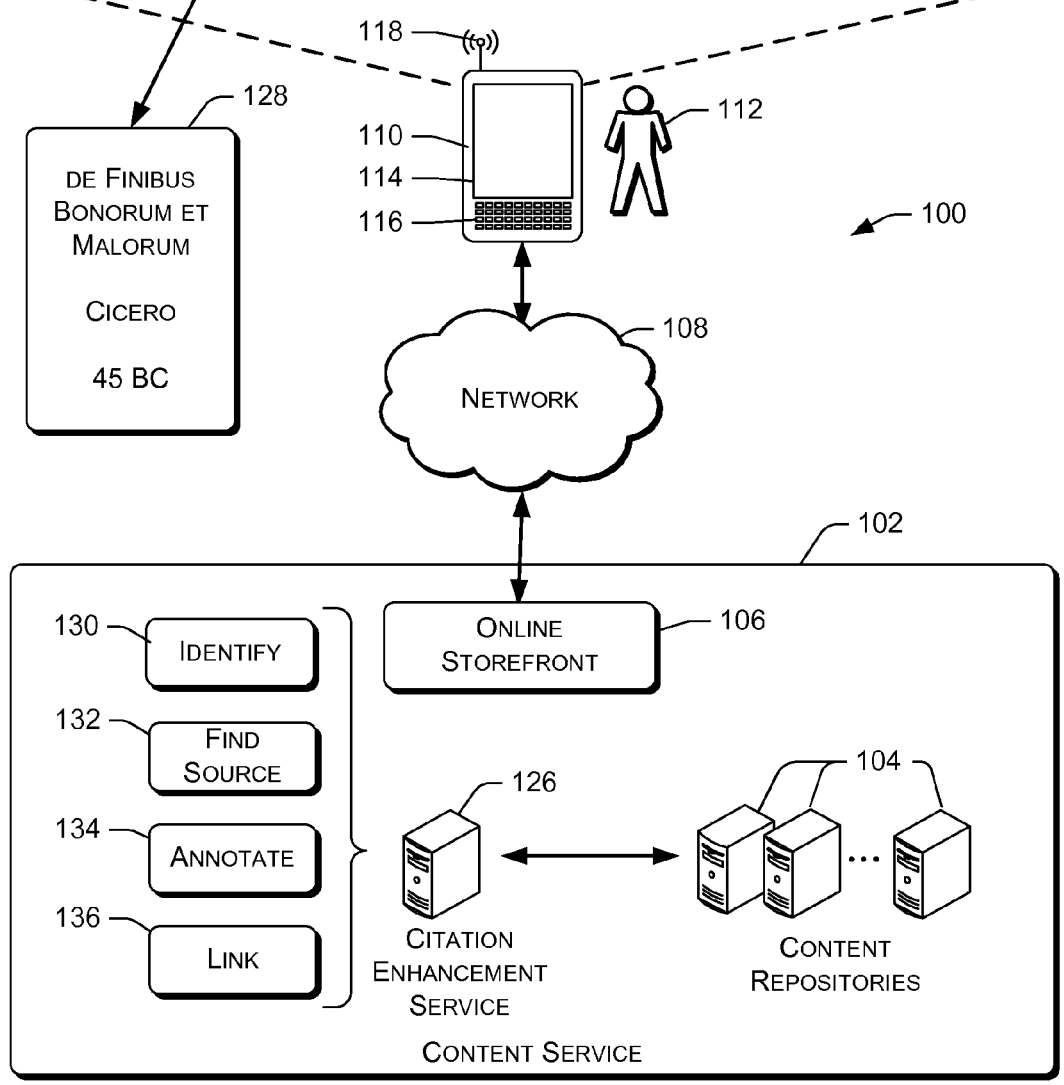

FIG. 1 shows an illustrative environment 100 configured to distribute electronic books (eBooks) and other digital or electronic textual materials to human readers or consumers. For discussion purposes, the architecture and techniques are described in an online context where content items are retrieved from an online service having remote servers. However, the concepts described herein are also applicable in other architectures, such as offline environments.

The environment 100 has an online content service 102 from which content items can be purchased or otherwise obtained. The content service 102 includes content repositories or servers 104 that store content items such as eBooks and other textual content items. The terms "electronic document", "electronic book", and/or "eBook", as used herein, include electronic or digital representations of printed works, as well as digital content that may include text, multimedia, hypertext, and/or hypermedia. Examples of printed and/or digital works include, but are not limited to, books, magazines, newspapers, scholarly works and papers, journals, reference materials, telephone books, textbooks, anthologies, instruction manuals, proceedings of meetings, forms, directories, maps, web pages, etc. Accordingly, the terms electronic document, electronic book, and eBook may include any content that is in electronic or digital format.

The content service 102 might be implemented in some embodiments by an online merchant or vendor. Electronic books and other electronic content might be offered for sale by such an online merchant, or might be available to members or subscribers for some type of periodic or one-time fee. In some circumstances, eBooks or other content might be made available without charge.

The content service 102 may have a virtual storefront 106 or other type of online interface for interaction with consumers and/or devices. The storefront 106 may expose a graphical, web-based user interface that can be accessed by human users to browse and obtain (e.g., purchase, rent, lease, etc.) content items such as eBooks. The storefront 106 may also expose programmatic interfaces that devices can use to obtain digital content items. In the illustrated embodiment, the storefront 106 allows devices to obtain content items from the content repositories 104. In addition, the storefront 106 may offer physical merchandise and/or services for sale. For example, it may be possible to purchase paper-based books through the online storefront 106.

The content service 102 may have wide-area network connectivity, allowing communication between the content service 102 and remote consumption devices or readers. In the example of FIG. 1, the content service 102 communicates through a public network 108 such as the Internet. Other networks might be used, such as private networks, cellular networks, and other types of networks with wide geographical coverage. In practice, a combination of different types of networks and network technologies are often involved in communications between the content service 102 and remote consumption devices.

As an example of a remote consumption device, FIG. 1 shows an eBook reader device 110, along with a user 112 of the device. The eBook reader device 110 can be a device dedicated to and specifically configured for rendering eBooks. While FIG. 1 illustrates the eBook reader device 110, other implementations may employ other types of electronic devices, such as a cellular phone, a personal digital assistant, a personal music player, a tablet computer, a laptop computer, etc., having resources or functionality for rendering electronic content items.

In this example, the eBook reader device 110 is a hand-held, portable device having a display 114 upon which eBooks can be displayed. The display 114 may be implemented with touch-sensitive technology that is responsive to user input registered via, for example, a finger, a stylus, or other similar pointing device. The display 114 may comprise any sort of display technology including a passive display (e.g., an electrophoretic display, etc.), an active display (e.g., a liquid crystal display (LCD), a light-emitting diode (LED) display, etc.), and/or the like. The eBook reader device 110 may also include a keyboard 116 or other types of actuatable elements that may have dedicated or assignable operations. For instance, the device 110 may have a power on/off button, selection keys, joystick, touchpad, and so forth.

The display 114 presents content in a human-readable format to the user 112. The display 114 may depict, for example, text of the eBooks, along with illustrations, tables, or graphic elements that might be contained in the eBooks. In some cases, the eBooks may include multimedia components, such as video or audio. In such scenarios, the display 114 (or an additional display) may also be configured to present video, and the device 110 may be equipped with audio output components to play audio files.

In the particular embodiment illustrated by FIG. 1, the eBook reader device 110 has a wireless communications receiver or transceiver 118, represented in FIG. 1 by an antenna symbol. The wireless communications receiver or transceiver 118 is configured to communicate wirelessly through the network 108 with the online storefront 106 of the content service 102.

The wireless communications receiver or transceiver 118 can be a wireless local-area or wide-area network receiver, transceiver, or port, configured to communicate through a local-area or wide-area network using conventional IP (Internet Protocol) and IP-related protocols for wireless network communications. Alternatively, the wireless communications receiver or transceiver 118 might be a cellular-based communications component or device such as used in mobile telephones or other personal communications devices.

FIG. 1 includes an example of a textual pane 120 that might be generated by the eBook reader device 110 and shown on the display 114. The textual pane includes primary content 122 and a citation 124. In this example, the primary content 122 is an excerpt from a work entitled "de Finibus Bonorum et Malorum", by Cicero. The excerpt is identified by the citation 124: "from 'de Finibus Bonorum et Malorum", written by Cicero in 45 BC."

The citation text "de Finibus Bonorum et Malorum" is underlined or otherwise highlighted to indicate that it can be selected by the user. The user can select the citation 124 by touching it, clicking on it, moving a cursor to the citation 124 and pressing an action or select button, or by any other suitable means, depending upon the implementation of the eBook reader device 110.

The content service 102 has a citation enhancement service 126 that identifies citations within eBooks or other content items and associates them with online sources of the objects of the citations. As an example, the content item displayed within the pane 120 includes the citation 124, whose object is a cited content item 128 entitled "de Finibus Bonorum et Malorum". The cited content item 128 may be available from the content service 102 or from other sources, including free online sources. The citation 124 is thus associated with a link or other reference to an online source of the cited content item 128. In some cases, the citation 124 might be associated with an HTTP (hypertext transfer protocol) URL (uniform resource locator), indicating a web address that can be opened by a browser or other client software. In other cases, the citation 124 might be associated with a product identifier or some other code identifying the cited content item.

More specifically, the citation enhancement service 126 performs a process of annotating citations to indicate corresponding sources of the objects of those citations. This process is indicated by blocks 130, 132, 134, and 136, corresponding to acts or actions performed by the citation enhancement service 126 in some embodiments.

At 130, the citation enhancement service 126 examines content items and identifies any references within the content items to works, content items, portions of content items, merchandise, services, or other products that might be available to the user from an electronic or online source. Thus, citations are not limited to association with only written content, but may also be associated with physical goods, products, services, merchandize, consumable items, food, and other non-written items. Identifying citations can be performed manually or by an automated process. When performed manually, a technician reads or peruses each content item looking for citations to products that may be electronically available, and marks any citations that are found.

Automated identification processes may be based on keyword searches or more sophisticated algorithms. For example, some embodiments may compare the text of an eBook to the names, titles, or descriptions of known content items or other available products. More generally, certain embodiments may search within content items for references to products (e.g., tangible goods, digital content items, services, etc.) that are offered for sale through the content service 102 and its online storefront 106. Other embodiments may perform more generic searches, perhaps identifying textual strings having certain properties, such as text within quotations, followed by the word "page" and numerals. The content service 102 may also identify citations that may not point to or link to an available item and/or service, but may point to or link to an available item and/or service in the future. These may be referred to as placeholder citations. The citation may indicate the availability state of the item (e.g., available now, available on July 27, currently unavailable, etc.). Later, when the corresponding item and/ or service become available, the content service may update the corresponding citation to link to available item and/or service. The citation may also be used to facilitate pre-sales, creation of saved item lists, and other conveniences.

These are of course very simplified examples, and much more sophisticated algorithms may be devised for automatically identifying citations to electronic content items and other products. For example, regular expressions may be used to define more complex citation forms and to thereby identify potential citations. In some embodiments, potential citations might be identified and highlighted, and subsequently verified by human analysts.

After identifying citations within content items, the citation enhancement service 126 performs an action 132 of finding or determining online sources corresponding to the cited products. In many cases, the content service 102 itself might be the source of different cited products. More specifically, there may be a specific page or URL (uniform resource locator) within the content service 102 that describes a cited product and makes it available for purchase. In other cases, the source of a product might be identified by a URL to a different provider, vendor, or website. The action 132 of finding sources can be done manually by a technician or analyst, or through some type of automated process. The operation 132 may be an iterative operation that updates the citations when items become available (or possibly unavailable). For example, the operation 132 may be performed to update citations of an eBook for a user after approval by the user to update the citations, automatically, periodically, and so forth. When the citations do not link to an item (i.e., placeholder citations), then the operation 132 may associate an item when it becomes available or may associate an item that may soon be available in the future (e.g., pre-order item).

At 134, the citation enhancement service 126 annotates the content items so that a user can tell that a citation has been associated with a product. This might consist of stylizing the citation such as by highlighting or underlining the citation, adding a virtual button for the citation, and so forth.

At 136, the citation enhancement service 126 associates or links each identified citation with an online source of the citation's object. This can be accomplished by inserting hyperlinks in the content items. In many embodiments, the actions 134 and 136 can be performed as a single step of associating a hyperlink with the text of a citation. This may be particularly true where content is presented and consumed using HTML (hypertext markup language) or some other markup language. In this situation, the citation is marked as being a hyperlink, and a web URL (uniform resource locator) is specified in the markup. The viewer or viewing device is configured to recognize the markup specification, to visibly highlight the marked citation, to respond to user selection of the marked citation by navigating to a web page indicated by the web URL, and to display or otherwise render the web page or other online content.

The linking 136 can be accomplished in other ways, such as by specifying product codes or identifiers and somehow associating the product codes or identifiers with the corresponding citations. A viewing device might be configured to identify such codes or identifiers and to dynamically locate the corresponding content items or other products.

The objects of citations may be nearly anything, but in many cases will be things that are available from online sources. In particular, it may be possible for a service provider to increase sales revenue by identifying citations to products offered by that service provider. In FIG. 1, for example, the object of the citation 124 is the content item 128, which may be available from within the content repository 104 of the content service 102.

In some cases, the object of the citation may be something that is being offered for sale by the content service 102 or by another vendor or provider. In other cases, the object of the citation may be something that is available at no cost to the user or reader.

The objects of citations may not always comprise digital content items. Rather, some citations may be to physical items, services, or other types of merchandise. For example, an eBook might contain a reference to a particular trademarked product such as a brand of sunglasses. In this situation, the product name might be identified as a citation. As another example, some content items such as certain books or papers may be available only in printed, physical form. In this case, a citation may be associated with an offer to sell the physical item, for subsequent shipment to the purchasing user.

Although revenue opportunities may be increased by identifying citations to products offered by the content service 102, some identified citations might be to content items or other digital information that is freely and publicly available from various online sources other than the content service 102.

Citations may be explicit or non-explicit. FIG. 1 shows an example of an explicit citation, in which the object of the citation is identified specifically and unambiguously. The use of a trademarked product name, discussed above, may be another example of an explicit citation. However, some citations may be more ambiguous and in some cases may not have even been intended by the author to reference any specific thing. For example, a content item might merely mention a "figurine." In some embodiments, citation enhancement service 126 might treat this as a citation, and link the citation to a listing of figurines that can be purchased from the online storefront 106. Alternatively, the citation might be linked to some other online merchant of figurines who has paid to be referenced in this manner.

Because identifying citations within content items can increase revenue opportunities, it may be desirable in some situations to reward authors or publishers for identifying and annotating citations. One way this might be done is to provide consideration to authors or publishers for themselves performing one or more of the actions 130, 132, 134, and 136 of FIG. 1. For example, authors or publishers might provide an eBook that has already been marked up to associate hyperlinks with citations. Consideration might be issued to the authors or publishers when users select citations that have been identified or marked up in this manner by those authors or publishers, or when users select such a citation and subsequently purchase the object of the citation. Consideration can be in the form of cash, additional royalties, promotional credits, gift cards, click-through or referral credits, free downloads, etc. In some situations, content consumers themselves might be incentivized to identify and annotate citations in this same manner—by providing the annotating consumers with these types of consideration when other users select the citations identified by the consumers. In some embodiments, the content service 102 may provide profit sharing for purchase of items using the citations. An associate revenue tracker may be used to share profits with other entities besides the entity (seller) performing a sale of a selected item via a citation. For example, the seller may share a portion of the profit (as determined by the associate revenue tracker) with an entity that provides the citation, an entity responsible for content that includes the citation, and/or other entities associated with the citations and/or purchase.

Note that citation enhancement might be performed using any combination of automated and human based processes. For example, an automated search algorithm might first identify potential citations and flag them for further analysis and verification by human analysts. The human analysts might include authors and/or publishers, who may be notified of any incentives that might be available for providing or correcting the proposed citations and targets.

After the automated searching has flagged potential citations, the human analysts may examine and verify them. Some proposed citations may be accepted, while others are rejected or accepted after correction. The automated search algorithm might in some cases also propose potential targets of the citations. The human analysts might alternatively supply targets of the citations, or might verify and/or correct any targets proposed by the automated process.

Illustrative Interfaces and Operations

Figure 2A:
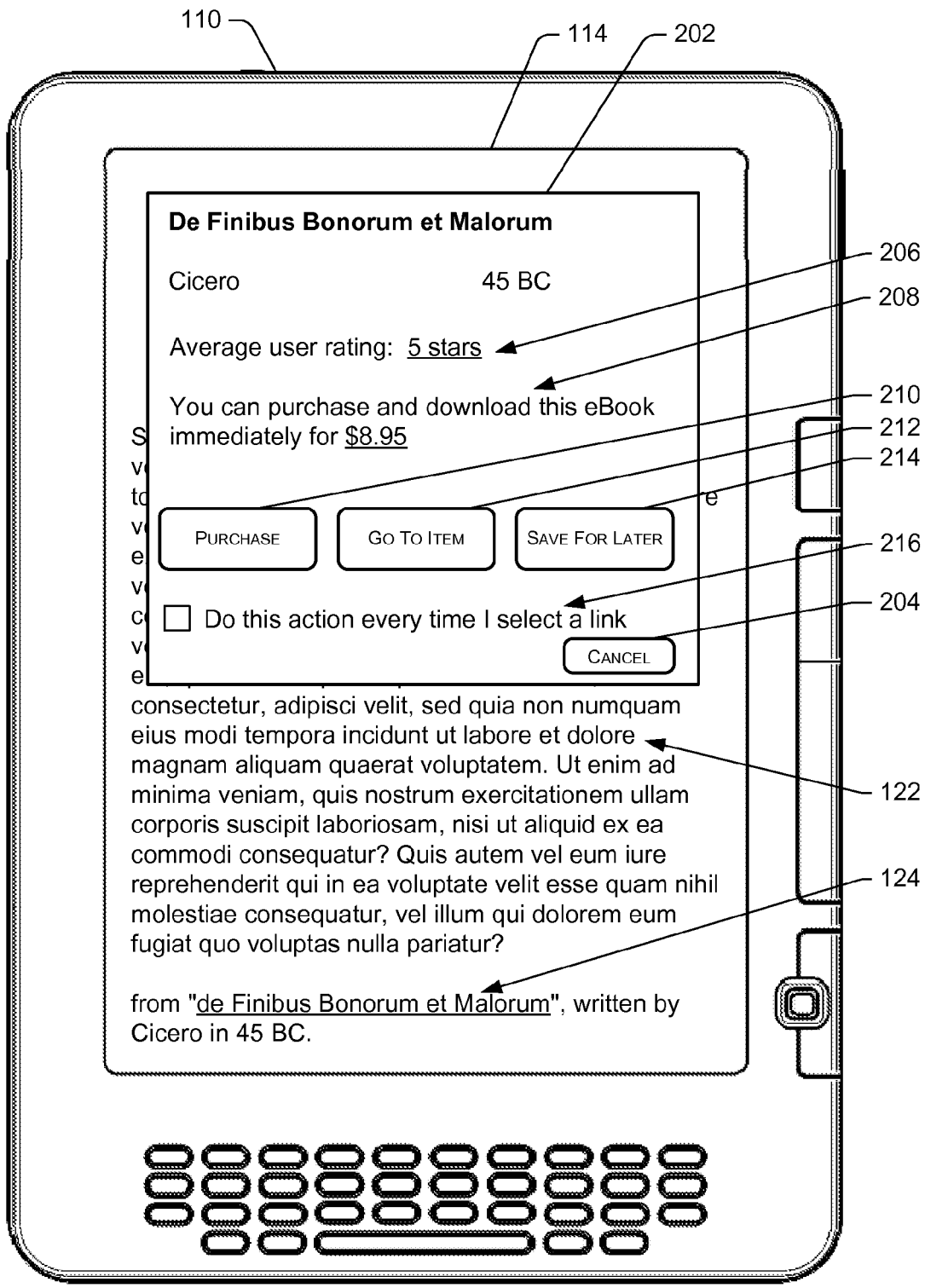
FIGS. 2A-2C are diagrams of an eBook reader device upon which enhanced electronic content is displayed.
Figure 2B:
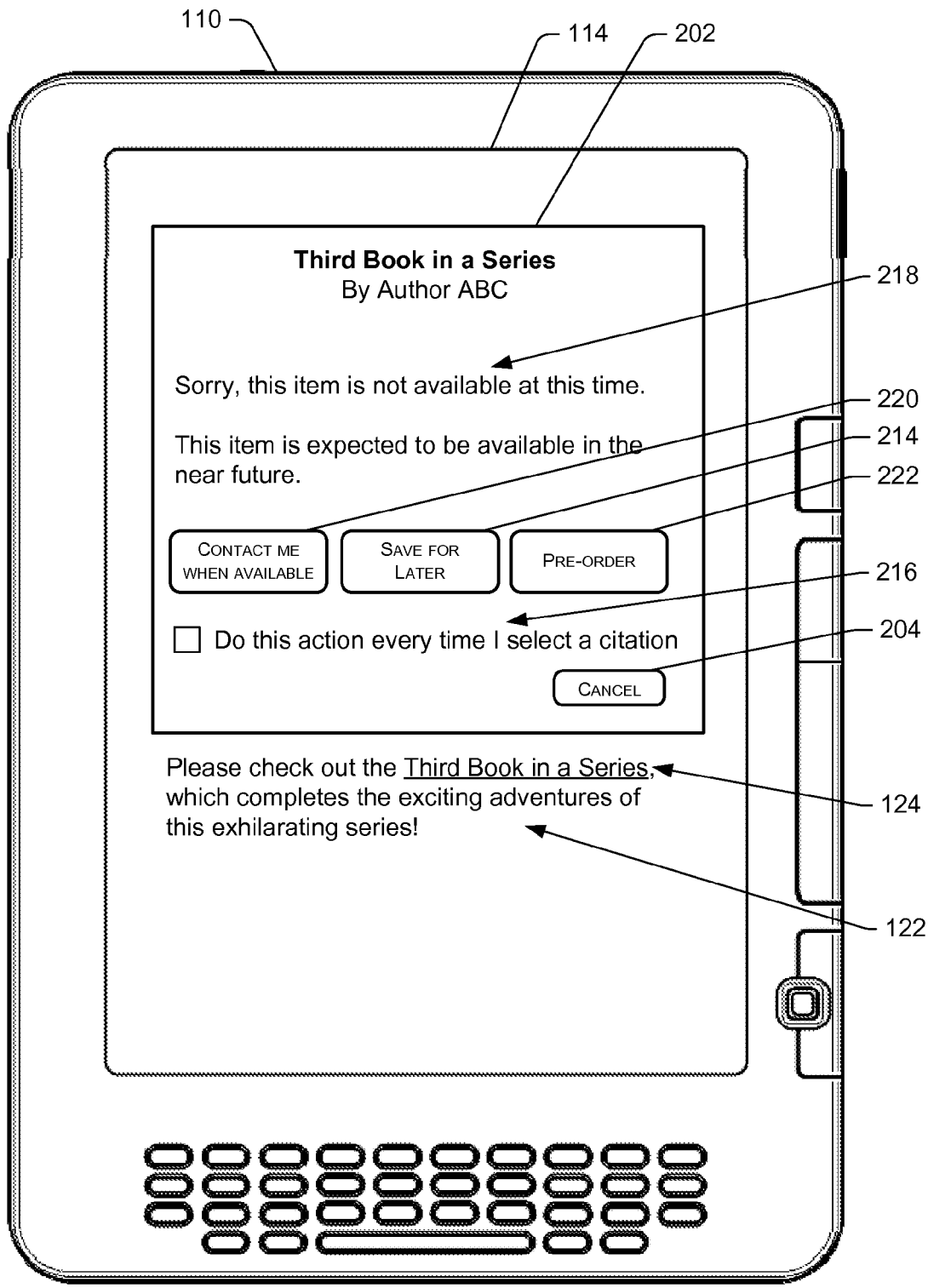
Figure 2C:
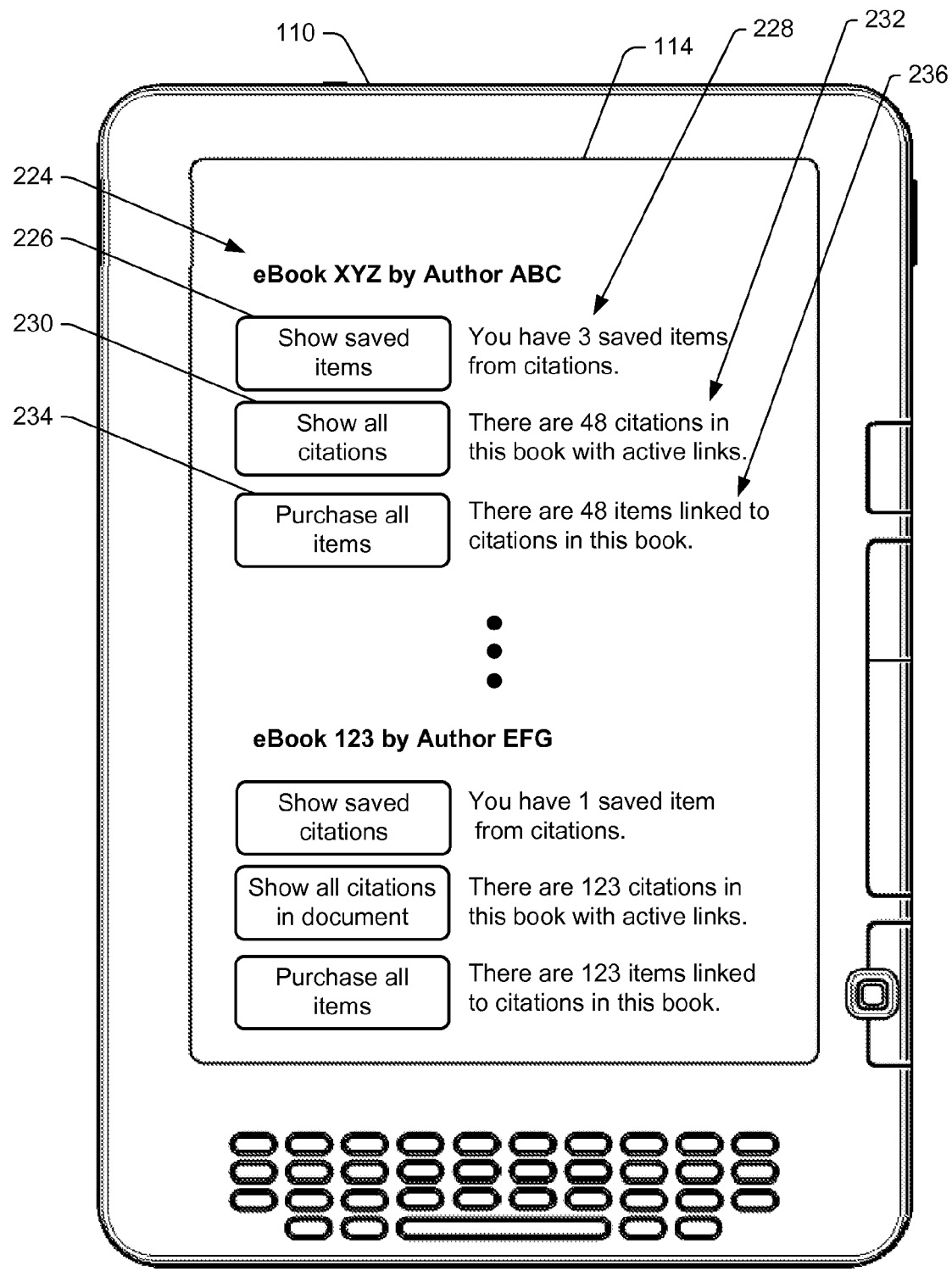

FIGS. 2A-2C are diagrams of an eBook reader device upon which enhanced electronic content is displayed. FIG. 2A shows a citation for an available item, FIG. 2B shows a citation for an unavailable items, and FIG. 2C shows options for viewing various citations in an eBook. Each of the figures is described in turn.

FIG. 2A shows an example of how citation linking might look to a user of the eBook reader device 110. This example assumes that the user is viewing the textual primary content 122 shown in FIG. 1, and that the user has selected the citation 124 by touching it, clicking on it, or moving a cursor to it and pressing a selection key. This example also assumes that the citation links to an item and/or service that is currently available for consumption (e.g., purchase, download, access, etc.).

Interacting with the citation 124 in this manner causes the reader device 110 to display an item detail pane 202. In this case, the item detail pane 202 overlays primary content 122 so that the user can easily return to the primary content by selecting a "cancel" control 204. In other embodiments, selecting or interacting with the citation 124 might open a dedicated Internet browser, which in turn is directed to a web site on which the cited content item is offered for sale.

The item detail pane 202 shows details about the product referenced by the citation 124, including in this case its title and bibliographic information. It may also show other information, such as summaries, descriptions, and images. The displayed information may also contain user-contributed or community-generated information and/or statistics, such as an average user rating 206 of the cited product. Other user-contributed information might include reviews, critiques, summaries, comments, evaluations, and so forth. A variety of other information can be included in the detail pane 202, depending on the nature of the cited product and the information available regarding that product.

The item detail pane 202 may also include an offer 208 to sell the cited product, which may indicate the price of the offered product. In this case, because the cited product may be a digital content item, the offer 208 indicates that user can purchase and immediately download it to the reader device 110. The user can purchase the product by selecting a "Purchase" control 210. Mechanics of purchase, payment, and downloading or shipment can be handled in various ways, such as by stepping the user through a series of additional panes requesting payment information and confirmation. Where the product is not a content item, and needs to be shipped to the user, the user may also be requested to provide shipping information.

In some embodiments, the average user rating 206, the offer 208, and/or other data associated with the citation 124 may be updated when such information changes (e.g., becomes available, is updated, etc.). For example, the offer 208 may be updated to a different price after the price of the item is modified, next time the citations are updated, or at other times. The offer 208 may also be valid for a specified amount of time. For example, the offer 208 may state that it is valid until a determined date, length of time, until next updated, etc. In some instances, a time of the selection of the purchase command 210 may be used to determine whether the user qualifies for the price shown in the offer 210, such as when the user selects the purchase command 210 but does not have network connectivity until a later time, which allows the purchase command to be transmitted to a server.

In various embodiments, the item detail pane 202 may include a "go to item" control 212 that may open a page that shows more detail about the item, opens the item itself (when the item has already been acquired), opens a browser page and/or performs a corresponding search, or otherwise directs the user interface to show the item or information about the item. A "save for later" control 214 may allow the user 112 to mark the item to be saved for later, such as in a saved item list. For example, the user may desire to review and possibly purchase the item later. The user may desire to continue a task at hand (e.g., reading the primary content 122, etc.), and not have to take additional steps to purchase or otherwise obtain the item via the item detail pane 202. In some instances, the "save for later" control 214 may enable the user 112 to specify a grouping or list in which to add the item following selection of the "save for later" control 214. For example, the user 112 may maintain various lists of items, such as a registry list, a birthday list, a reading list, and so forth, each being accessible via the "save for later" control 214. In some instances, the items may be stored in lists based on a type of the item, such as a category of the items, a digital or physical nature of the item, and/or based on other factors. By storing digital items in a specific location, the user 112 may easily obtain the digital items by requesting a download of a digital item, possibly after purchasing the item, using the eBook reader device 110 or another electronic device that has access to items saved from the citations.

In accordance with some embodiments, items saved using the "save for later" control 214 may be saved as references for later retrieval and may be physical items. The content service 102 may convert the physical items into digital items after the physical items are saved as references. For example, the content service 102 may convert or transcode a physical media item, scan a book to obtain digital content, or perform other conversions to obtain a digital version of a physical item. The content service 102 may upload the digital item for consumption by the user 112, such as after a request for the item by the user. As an example, the content service 102 may automatically convert a physical item into a digital item, when possible, after a predetermined number of users save the item using the "save for later" control 214 or take other action to trigger the conversion.

A default control 216 may enable the user to create a default option for future interactions with citations in the primary content 122 and/or other content. For example, the user 112 may select the "save for later" control 214, and then select the default control 216 so that future selections of citations automatically save the citations for later retrieval, as discussed with reference to FIG. 3C. The default control 216 may be updated in another menu or otherwise deactivated. In some instances, update of the default control 216 may be made by a special selection, such as double selecting (or via another special selection or gesture) the citation 124 to open the item detail pane 202, and thereby create a new default or clear the default via the default control 216.

In many situations, such as when the product is available from the content service 102, the user will already have an account with the vendor of the product, and the purchase may be accomplished by referencing information already available to the vendor, without significant further interactions.

In some embodiments, selecting or interacting with a citation may result in a list of potential products from which the user can choose. For example, such a listing might relate several products all relating to the citation.

Furthermore, citations and offered products may be filtered based on user preferences. For example, some users may only want to see citations to electronic content that is immediately available. Unavailable items may be managed as shown in FIG. 2B. Other users may want to see citations to paper-based content. Still other users may want to see citations to services and non-content products.

Citations and offered products may also be identified based on ratings or other criteria. For example, a citation to an eBook about a particular historical topic might be chosen as the target of a citation based the ratings it has received from users.

FIG. 2B shows the detail item pane 202 featuring an unavailable item. The detail item pane 202 may include a message 218 that informs the user 112 that the item is currently unavailable. In some instances, the message 218 may include an availability date, if known. For example, when the item is known to be released in the future, pending an official release, then the release date may be included in message 218, along with other possible information such as an expected price, a pre-order promotion, and so forth.

The detail item pane 202 may include various controls, which may be presented to the user 112 based on a status of the item. For example, some of the controls may be shown when the item is offered via a pre-order and not shown when the item is not offered via the pre-order. A "contact me when available" control 220 may enable to user 112 to opt-in to receive a communication when the item becomes available. The communication may be via a messaging service that is integrated with the eBook reader device 110 or separate from the eBook reader device 110. For example, an integrated service may provide a notification in the eBook reader device (e.g., pop up message, message in inbox, etc.) when the item becomes available and the availability is transmitted to the eBook reader device via the network 108. A separate communication service may be an electronic mail (email) service, a text message, or other types of messages transmitted to the user 112 via a computing device. In various embodiments, the availability of the item may be determined when a particular provider or other providers assign a reference number to the item, offers the item for sale, list the item on a page, or otherwise indicate availability of the item.

In some embodiments, the detail item pane 202 may include a "pre-order" control 222. The "pre-order" control 222 may be available when the item is offered via a pre-order and may not be available when the item is not offered via the pre-order. The "pre-order" control 222 may allow the user 112 to pre-order the item, such as an item that is scheduled for release at a future date. In some embodiments, the per-order may include a price, quantity restriction, promotion, or other additional information.

FIG. 2C shows options for viewing various citations in an eBook. The display 114 may present a user interface that displays details 224 for an eBook and various controls. A "show saved items" control 226 may enable access to a list or group of items that were saved using the "save for later" command 214 shown in FIGS. 2A and 2B. A message 228 may indicate information about the contents accessible via the "show saved items" control 226, such as a number of items in the list or other details. A "show all citations" control 230 may enable access to a list or group of all citations and/or items associated with the citations for the eBook. For example, and eBook may contain 48 citations, which may associate with 48 items, more items, or fewer items. The various between citations and items may be a result of multiple items being available for a citation, unavailable items for some citations, and so forth. A message 232 may list the number of citations, the number of items, and/or other details. The citations 230 may be searchable (via tags, markers, etc.) or may be included in a separate file, which is discussed in further detail below. Other eBooks may be listed in the user interface and may include the same or other controls. A "purchase all items" control 234 may enable the user 112 to purchase all the items associated with the citations. For example, the user 112 may desire to purchase all academic papers referenced in a journal. A message 236 may list the number of items linked to citations in the book or document.

Illustrative Operations

Figure 3:
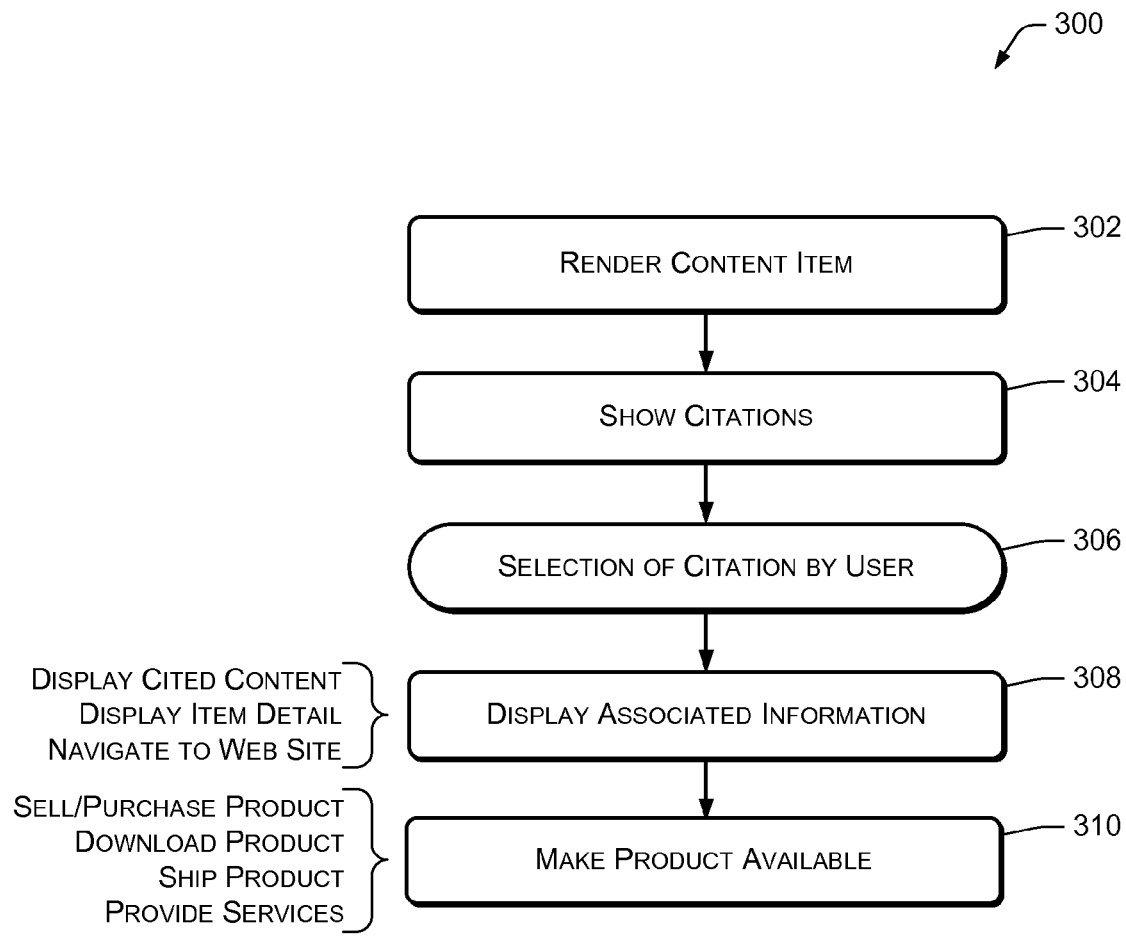
FIG. 3 is a flowchart showing actions performed by an eBook reader device when rendering enhanced electronic content.
Figure 4A:
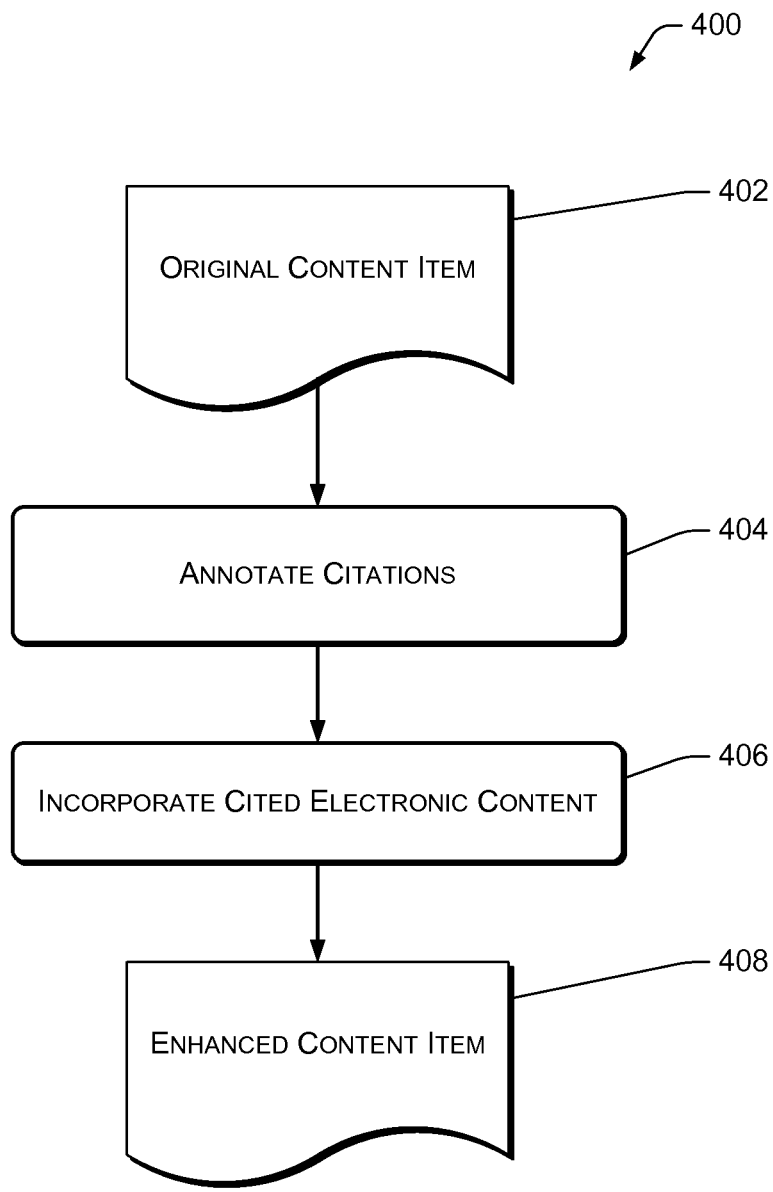
FIGS. 4A and 4B are flowcharts showing actions performed to generate certain types of enhanced electronic content.
Figure 4B:
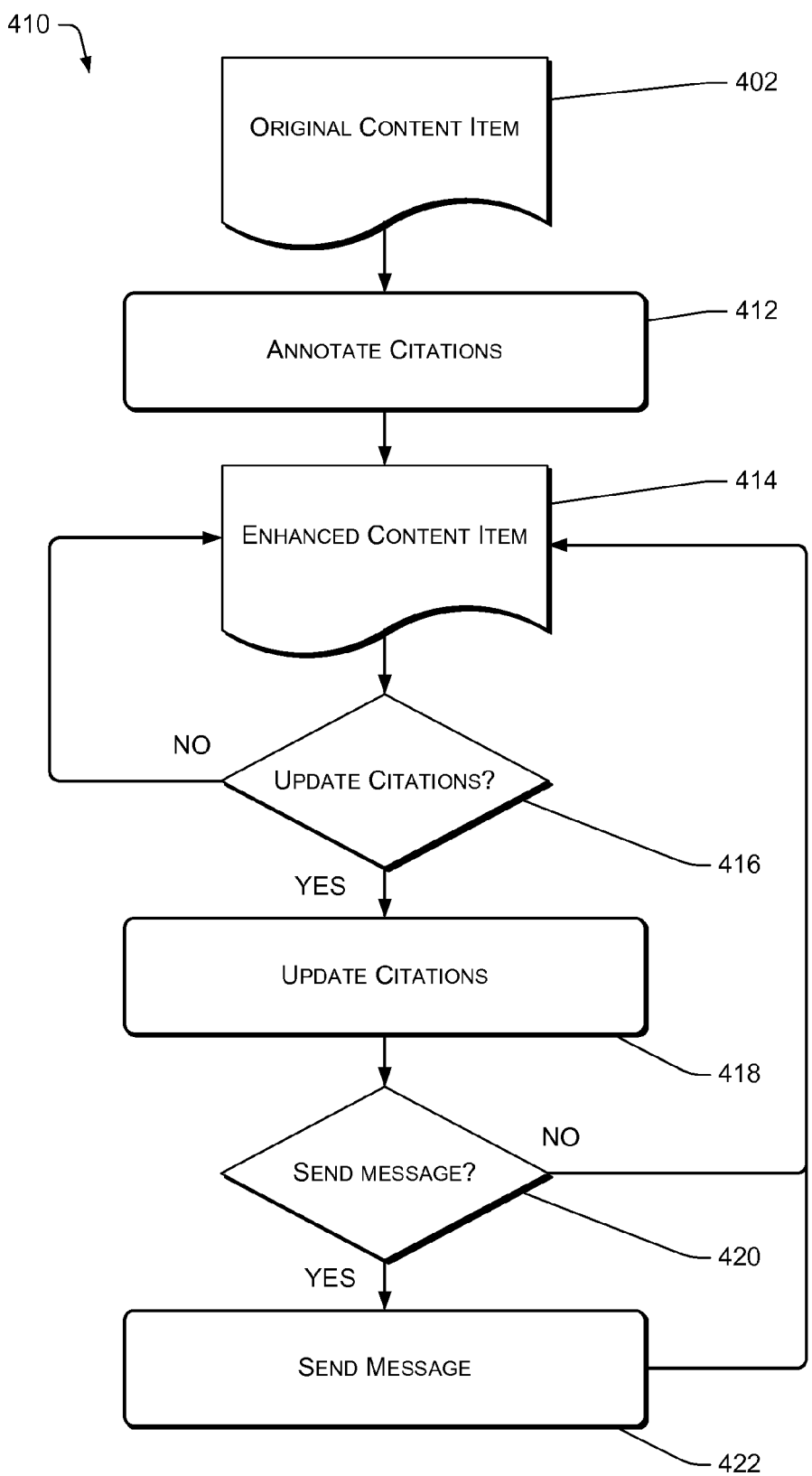

FIGS. 3, 4A and 4B show illustrative processes for presenting citations. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 shows a process 300 performed at the eBook reader device 110 when presenting an eBook or other content item in which citations have been marked or annotated as described above.

At 302 a content item such as an eBook is rendered, for example on the display 114 of the eBook reader device 110. At 304, citations are displayed as being highlighted, annotated or somehow visually indicated to show that they have been associated with additional content or information. Such indications can consist of highlighting, displaying text of citations in different colors, underlining, or displaying pop-up information when a user "hovers" with a cursor over the citation.

In some embodiment, user preferences may be established to determine which citations should be shown or highlighted. For example, a user may indicate through preferences that only citations to electronic content are to be shown. If preferences such as this are established, the eBook reader device may filter citations, and highlight only those that meet the criteria specified by the user in the user's preferences.

At 306, the user selects or otherwise interacts with the citation. This interaction can be facilitated by using different mechanisms, depending on the user interface of the eBook reader device 110. The user may physically touch the citation with a finger, or may move a cursor to the citation and press a select button. As another example, the user may merely move a cursor over a citation and let it rest or "hover" there.

In response to interaction 306 with the citation, at 308, the eBook reader device displays information that has been associated with the citation. This may be implemented as in the example of FIGS. 2A and/or 2B, in which a pop-up item detail pane 202 is displayed with the cited product. In other cases, the user may be directed to a web site where the product is offered for sale. In some cases, especially where the citation references online content that is publically available, the user may be taken directly to the content, or a pop-up pane may be opened displaying the content. Similarly, in some embodiments, the user may have membership in an organization from which certain documents are available without additional charge, and selecting a citation may take the user directly to such a document. In some embodiments, the user may be taken to the specific passage within the document that is referenced by the citation.

In some cases, a citation may refer to multiple items. A user may be given the ability to specify preferences, relating to the types of items that should be listed by citations. When user preferences are established in this manner, information displayed in response to selecting a citation may be filtered in accordance with the user preferences.

As another example, if the user already owns the content or content item corresponding to a particular citation, action 308 might comprise displaying the content or content item from the user's own data store. In this case, if the user does not already own the cited content, action 308 might comprise offering the content for sale to the user.

As another alternative, where citations are to passages from different eBooks or works, those passages may be embedded in the original eBook so that they can be quickly accessed and displayed. In some cases, this capability might be provided for an additional fee. In some cases, the action 308 might display the particular passage that has been cited, along with additional information about the different eBook and an offer to sell the different eBook in its entirety. This additional information may include community-generated information regarding the different electronic book as illustrated in the detail pane 202 of FIG. 2A.

At 310, the product may be made available to the user, such as when the product is available for immediate purchase or a future known purchase via a pre-order. Note that in some embodiments, the information associated with a citation may consist of the referenced content itself, so that selecting the citation causes the cited text or other information to be displayed at 308 without any further interaction such as purchasing or downloading. Action 310 can be omitted in this situation. When the item is unavailable without a known future sale, as discussed with reference to FIG. 2B, the action 310 may be omitted.

Action 310 can be performed in different ways, depending on the nature of the product that has been referenced by the citation. In cases where the referenced product is an electronically-available content item, it can be purchased, downloaded, and consumed immediately, on the same device used to consume the original content that contained the citation. In other cases, the referenced product may be of a different media type, or may consist of physical goods or services that are delivered to the user. Thus, making the product available might include selling/purchasing the product, downloading the product, shipping the product, or performing and delivering services.

FIG. 4A illustrates another process 400, which may be performed by the citation enhancement service 126 shown in FIG. 1. In the process 400, an original content item 402 is analyzed and, at 404, citations are annotated in accordance with techniques such as those described above with reference to actions 130, 132, 134, and 136 of FIG. 1. At 406, any content that has been determined to be the object of a citation is included or incorporated with the original content item 402, resulting in an enhanced content item 408. The enhanced content item 408 may be sold to users at a higher price than the original content item in some instances. Once an enhanced content item is purchased, annotated citations can be viewed or accessed by the purchasing user at no additional charge, simply by clicking on the annotated citations. Thus, by purchasing an enhanced content item, the purchasing user may obtain some or all rights to the objects of the citations within the enhanced content item. For instance, the user may obtain rights to the portions of the content items cited in footnotes of the enhanced content item, or to each cited content item in its entirety. In the former instances, for example, when the enhanced content item includes a footnote reference for a particular set of pages of a physical or electronic book, the user may be able to view that particular set of pages but may need to purchase the associated book if the user wishes to obtain the entire book.

The cited content included as part of the enhanced content item 408 may be actually incorporated with the original content item, or the original content item may have direct links or references to the cited content. Again, the enhanced content item 408 may include rights to the entire works or content items referenced within citations, or may include rights only to the cited passages of the referenced works.

FIG. 4B illustrates another process 410, which may be performed by the citation enhancement service 126 shown in FIG. 1. In the process 410, the original content item 402 is analyzed. At 412, citations are annotated. The annotations may be created for available items, unavailable items, and/or items known to be available on or after a future date, and that may or may not be pre-order items. In some embodiments, the citations may be created as separate items stored in a file or files separate from a file storing the associated eBook. The citations may also be created as tags or objects included in the eBook file. The citations may include data, metadata, links, descriptions, and/or other information as shown and described with reference to FIGS. 2A and 2B. Thus, when the eBook is rendered by the eBook reader device 110 and presented to the user 112, the user may select the citations as described herein. The citations with the additional data may be included in an enhanced content item 414, which contain the selectable citations.

As described above, some of the information associated with a citation may change over time, such as the average user rating 206, the offer 208, the availability of the item, and/or other information. At 416, the process may determine whether to update the citations. The update may be performed at regular intervals, periodically, in response to a triggering event, or at other times. The triggering events may include updates to prices or other data included in the citations, connection of the eBook reader device 110 to the content service 102 via the network 108, a user request to update, and/or other triggering events. In some embodiments, the user may allow or reject an update (e.g., via a user approval control, etc.). For example, the eBook reader device 110 may request permission or an authorization from the user prior to updating the citations and/or other content stored by the eBook reader device. When the update is determined to be performed at 416, then the citations (e.g., tags, separate file(s), etc.) may be updated at 418. For example, when a citation is currently stored on the eBook reader device 110 and indicates that an associated item is unavailable, but the item has become available since in the meantime, then the update may add information, links, and/or other data to the citation to reflect the availability of the item. The update may update the average user rating 206, the offer 208, the availability of the item, and/or other information.

When no updates are to be performed at the decision operation 416, the process 410 may leave the enhanced content item unchanged. However, following a decision to perform the update at the decision operation 416, the update may occur via the annotate citations operation at 418, which may update all citations or only update some of the citations. In some embodiments, the operation 418 may rewrite the previous eBook and update all the annotations, such as recreating the entire eBook. In various embodiments, the operation 418 may update only the citations or citations that have changed (e.g., changes to the average user rating 206, the offer 208, the availability of the item, and/or other information). In the latter situation, the updates may be transmitted back to the eBook reader device 110 for incorporation with the eBook by the eBook reader device 110. For example, the content service 102 may update a file that includes the updated citations, transmit the updated citations with or without other data (e.g., the other content of the eBook), or otherwise update the citations without replacing the entire eBook. The eBook reader device 110 may merge or otherwise include the updated citations with existing data in the eBook. The eBook reader device 110 may, in some instances, replace the eBook and/or a citations file (if available) to include an updated version of the eBook and/or citations file when the updated version is available with changes to the citations.

Following the operation 418, the process 410 may determine at 420 whether to send a message to the user, such as in response to selection of the "contact me when available" control 220 for an item. When the message is to be transmitted based on the determination from the decision operation 420, the message may be transmitted at 422. The message may be transmitted by the eBook reader device 110, such as by a messaging system used by the eBook reader device (e.g., an inbox, message center, pop-up message, etc.). the message may be transmitted by other sources, such as email, text messages, etc.

Illustrative Computing Devices

Figure 5:
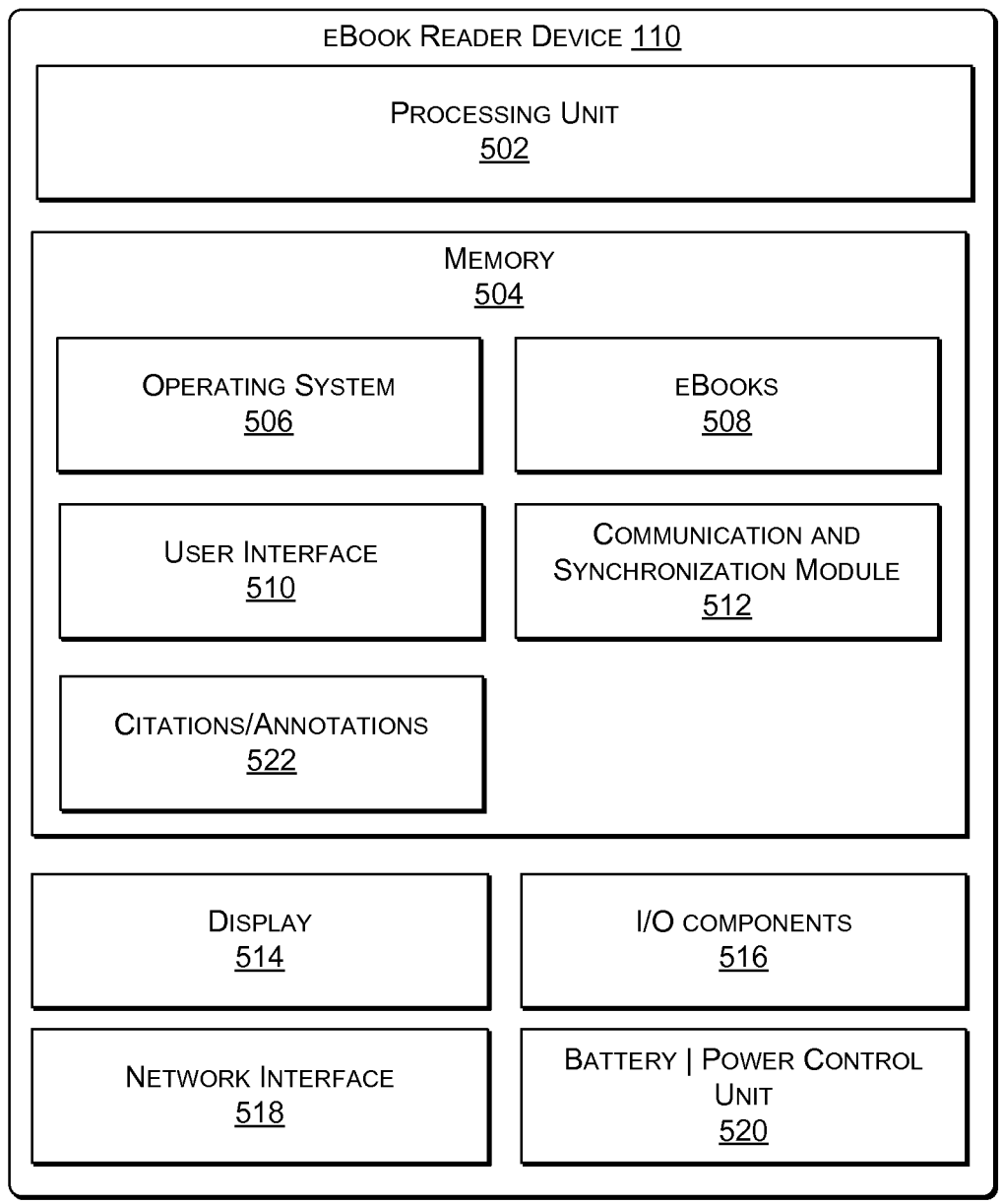
FIG. 5 is a block diagram showing relevant components of an eBook reader device.

FIG. 5 illustrates relevant components that might be implemented in the eBook reader device 110. In this embodiment, the eBook reader device 110 is a dedicated, handheld eBook reader device equipped with a display to display eBooks.

In a very basic configuration, the eBook reader device 110 includes a processing unit 502 composed of one or more processors, and memory 504. Depending on the configuration of the eBook reader device 110, the memory 504 is an example of computer storage medium and may include volatile and nonvolatile memory. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The memory 504 may be used to store any number of functional components that are executable on the processing unit 502, as well as data and media items that are rendered by the eBook reader device 110. Thus, the memory 504 may store an operating system 506 and an eBook storage database to store one or more media items, such as eBooks 508 and audio books.

A user interface module 510 may also be provided in the memory 504 and executed on the processing unit 502 to provide for user operation of the device 110. The UI module 510 may provide menus and other navigational tools to facilitate selection and rendering of the media items, such as the eBooks 508. The UI module 510 may further include a browser or other application that facilitates access to sites over a network, such as websites or online merchants, or other sources of electronic content items or other products.

The UI module 510 may include a content presentation application that renders the media items. The content presentation application may be implemented as various applications depending upon the media items. For instance, the application may be an electronic book reader application for rending electronic books, or an audio player for playing audio books, or a video player for playing video, and so forth.

A communication and synchronization module 512 is stored in memory 504 and executed on the processing unit 502 to perform management functions in conjunction with the content repositories 104 (FIG. 1). Communication and synchronization module 512 communicates with the content service 102 to receive eBooks 508 and with the online storefront 106 to obtain information relating to cited products, such as item detail pages relating to cited products.

The eBook reader device 110 may further include a display 514 upon which electronic books are rendered. In one implementation, the display uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The eBook reader device 110 may further be equipped with various input/output (I/O) components 516. Such components may include various user interface controls (e.g., buttons, joystick, keyboard, etc.), audio speaker, connection ports, and so forth.

A network interface 518 supports both wired and wireless connection to various networks, such as cellular networks, radio, WiFi networks, short range networks (e.g., Bluetooth), IR, and so forth. The network interface 518 facilitates receiving electronic books and other content as discussed herein. Of particular note, the network interface 518 enables wireless delivery of the eBooks 508 over a wireless network.

The eBook reader device 110 may also include a battery and power control unit 520. The power control unit operatively controls an amount of power, or electrical energy, consumed by the eBook reader device. Actively controlling the amount of power consumed by the reader device may achieve more efficient use of electrical energy stored by the battery.

In some embodiments, the eBook reader device 110 may also include citations/annotations 522, which may be stored separate from the eBooks 508. The separation of the citations/annotations 522 from the eBooks 508 may facilitate an update of the citations/annotations 522 without sending other data that does not need updating, such as the actual text of the eBook that may not need an update. The eBook may include tags, links, and/or associations that reference data in the citations/annotations 522. The communication and synchronization module 512 may communicates with the content service 102 to receive updates to the eBooks 508 and/or updates to the citations/annotations 522. As discussed above, the citations/annotations 522 may also be stored at tag, links, or updatable code in the eBook. Some citations may be marked at placeholder citations, which may be indicate that the citations can be updated when the corresponding item or items become available.

The eBook reader device 110 may have additional features or functionality. For example, the eBook reader device 110 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Figure 6:
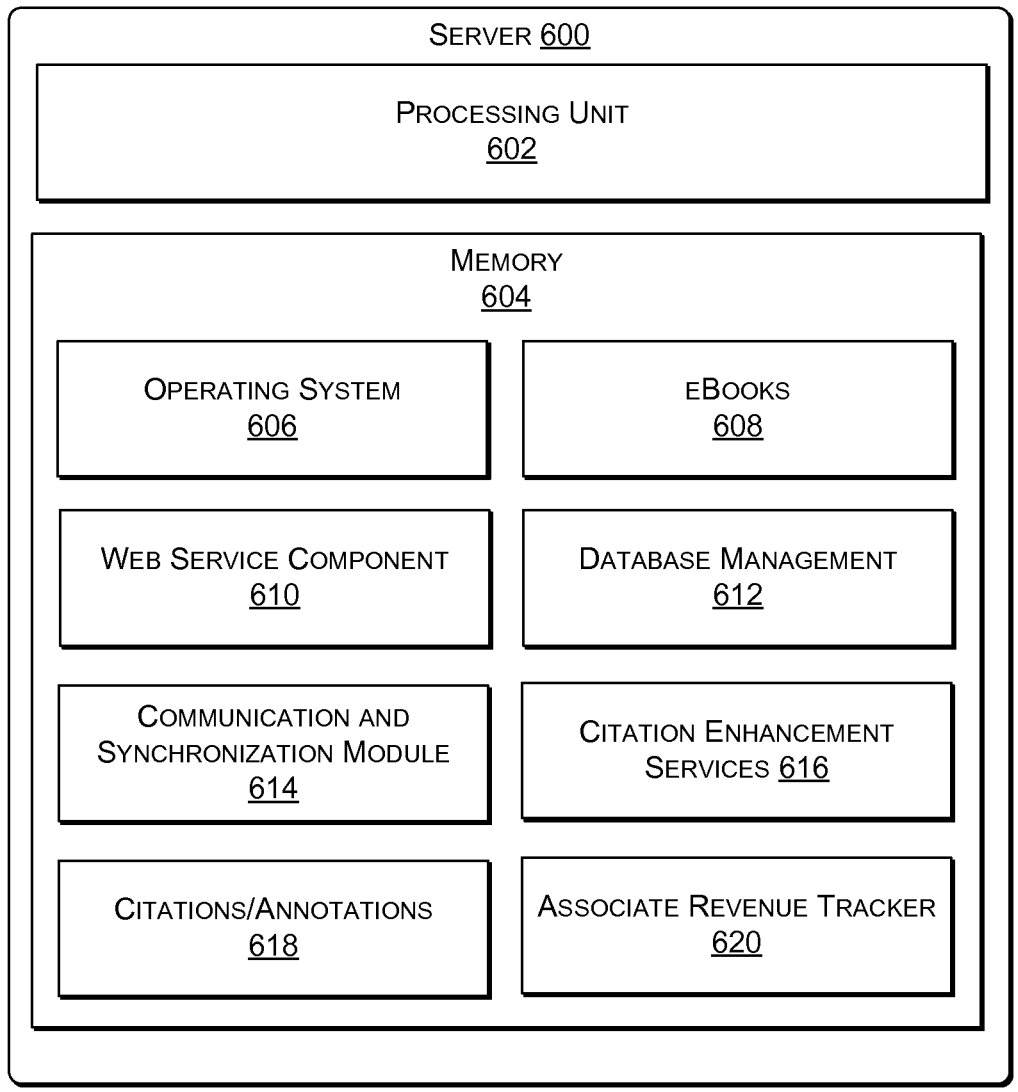
FIG. 6 is a block diagram showing relevant components of a server usable to perform various functions described herein.

FIG. 6 illustrates relevant components of a server 600 that may be used to implement the functionality of the content service 102. Generally, the content service 102 may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 600 might comprise a processing unit 602 composed one of one or more processors, and memory 604. The memory 604 is an example of computer storage medium and may include volatile and nonvolatile memory. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The memory 604 may be used to store any number of functional components that are executable on the processing unit 602, as well as data and content items that are supplied to consuming devices such as the eBook reader device 110. Thus, the memory 604 may store an operating system 606 and an eBook storage database to store one or more content items, such as eBooks 608.

Functional components of the server 600 may also comprise a web service component 610 that interacts with remote devices such as computers and media consumption devices. The online storefront 106 may be implemented by the web service component 610, for example.

The server 600 may also include various database management components 612 for keeping track of users, purchases, item status, etc. The server 600 may also include a communication and synchronization module 614 to communicate with remote consumption devices and to communicate any purchased electronic content to those devices.

The server 600 may include one or more citation enhancement services 616 that are configured to perform the process described above with reference to blocks 130, 132, 134, and 136 of FIG. 1, and the processes described above with reference to FIGS. 3, 4A, and 4B.

In some embodiments, the server 600 may include citations/annotations 618, which may be updated by the citation enhancement services. The citations/annotations 618 may store data used to update the citations/annotations 522 stored on the eBook reader device 110.

In accordance with various embodiments, the server 600 may include an associate revenue tracker 620. The associate revenue tracker 620 may track purchases for revenue sharing based on access via the citations. The content service 102 may provide profit sharing for purchase of items through the citations. The associate revenue tracker 620 may determine entities associated with the placement of the citation, the content from which the citation is located, and/or other entities that may have a potential stake in profits realized by purchases through the citations. The associate revenue tracker 620 may determine rules associated with sharing of the revenue or other amounts from purchases from the citations.

For example, a book by author X may be published by publisher Y and have citations entered by entity Z. The term "entities" includes humans as well as organizations, corporation, or other non-human entities. Later, a user may select a citation in the book and then make a purchase of an item that includes a cost and margin (or profit). The associate revenue tracker 620 may include rules, based on agreements or other information to allocate a portion of the cost or margin to any of the entities involved in realization of the purchase through the citation, such as the author X, the publisher Y, the entity Z, or possibly other entities associated with the process and/or citation. Thus, in some instances, the associate revenue tracker 620 may identify and provide compensation for click-through events performed in an eBook from the eBook reader device 110. In some embodiments, the associate revenue tracker 620 may be used to compensate entities for identifying and/or creating the citations.

The server 600 may of course include many other logical, programmatic, and physical components, of which those shown in FIG. 6 are merely examples that are related to the discussion herein.

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. One or more non-transitory computer-readable media storing computer-executable instructions on an electronic book reader device that, when executed on one or more processors, performs acts comprising:

receiving, by the electronic book reader device, first citation data for an electronic book, the first citation data including a first citation associated with a first product and a placeholder citation associated with a second product that is not yet available from an online source;

storing local citation data on the electronic book reader device based at least partly on the first citation data, the local citation data including the first citation and the placeholder citation, and wherein the local citation data associates the first citation and the placeholder citation with an electronic book file for the electronic book;

determining that the first product is available from a first online source;

rendering, based at least in part on the local citation data and the electronic book file, the electronic book on a display of the electronic book reader device, the rendering including inserting the first citation and the placeholder citation within the electronic book, the first citation comprising first information to cause the electronic book reader device, in response to receipt of a first user selection, to initiate a first acquisition of the first product from the first online source;

receiving, by the electronic book reader device, second citation data that indicates a second online source of the second product;

modifying the local citation data such that the placeholder citation includes second information allowing the human reader to obtain the second product from the second online source; and rendering, based at least in part on the local citation data and the electronic book file, the electronic book on the display of the electronic book reader device, the rendering including inserting a second citation within the electronic book in place of the placeholder citation, the second citation comprising third information to cause the electronic book reader device, in response to receipt of a second user selection, to initiate a second acquisition of the second product from the second online source.

2. The one or more non-transitory computer-readable media as recited in claim 1, wherein the acts further comprise, at a time at which the first product is available from the first online source, providing an offer to allow the electronic book reader to store an indication of the first product for retrieval by a user at a later time.

3. The one or more non-transitory computer-readable media as recited in claim 1, wherein the acts further comprise, at a time at which the first product is not available from the first online source, providing an offer to notify a user associated with the electronic book reader device after the first product becomes available from the first online source.

4. The one or more non-transitory computer-readable media as recited in claim 1, wherein the acts further comprise, transmitting an indication of a sale of the first product following activation of the reference by the electronic book reader device, the indication including fourth information to enable profit sharing of proceeds of the sale.

5. The one or more non-transitory computer-readable media as recited in claim 1, wherein the first product includes a service.

6. The one or more non-transitory computer-readable media as recited in claim 1, wherein at least one of generating the first citation or generating the placeholder citation is based at least in part on a request from a user received by the electronic book reader device.

7. The one or more non-transitory computer-readable media as recited in claim 1, wherein, prior to receiving the second citation data, the placeholder citation is configured to receive a third user selection, and wherein the acts further include presenting, based on the third user selection, a graphical user interface configured to:

notify a user associated with the third user selection that the second product is unavailable, and present a selectable option to cause a user account associated with the electronic book reader device to be notified at a time at which the second product becomes available.

8. The one or more non-transitory computer-readable media as recited in claim 7, wherein the graphical user interface is further configured to present a second selectable option to cause the second product to be pre-ordered from the second online source.

9. The one or more non-transitory computer-readable media as recited in claim 1, further comprising:
monitoring the first online source to detect a change in the first online source; and
modifying the local citation data based on the change.

10. The one or more non-transitory computer-readable media as recited in claim 9, wherein the change is a change in price of the first product.

11. The one or more non-transitory computer-readable media as recited in claim 1, wherein the acts further comprise:
determining that a triggering event has occurred; and
updating the local citation data based on detection of an occurrence of the triggering event.

12. The one or more non-transitory computer-readable media as recited in claim 11, wherein the triggering event comprises the electronic book reader device connecting with a content service.

13. A method, comprising:
receiving, by an electronic device, first citation data associated with a first citation and a placeholder citation in an electronic document, the first citation relating to a first content item, and the placeholder citation relating to a second content item that is not currently available;
storing local citation data on the electronic device based at least partly on the first citation data, the local citation data including the first citation and the placeholder citation, and wherein the local citation data associates the first citation and the placeholder citation with an electronic document file for the electronic document;
determining, by the electronic device and based at least in part on the first citation data, a first online source for the first content item;
rendering, by the electronic device and based at least in part on the local citation data and the electronic document file, the electronic document on a display of the electronic device, rendering the electronic document including inserting the first citation to the first content item and the placeholder citation within the electronic document, the first citation comprising information to cause the electronic device, in response to receipt of a first user selection, to initiate a first acquisition of the first content item from the first online source;
receiving second citation data indicating a second online source of the second content item;
modifying the local citation data such that the placeholder citation includes information allowing the human reader to obtain a second content item from the second online source; and
rendering, based at least in part on the local citation data, the electronic document on the display of the electronic device, the rendering including inserting a second citation to the second content item within the electronic document in place of the placeholder citation, the second citation comprising information to cause the electronic device, in response to receipt of a second user selection, to initiate a second acquisition of the second content item from the second online source.

14. The method as recited in claim 13, wherein storing the local citation data on the electronic device comprises storing at least a portion of the first citation data as updatable code in the electronic document file; and wherein modifying the placeholder citation comprises incorporating the second online source of the second content item in the updatable code.

15. The method as recited in claim 13, further comprising:
receiving, by the electronic device, a third selection of the placeholder citation; and
based at least in part on the third selection of the placeholder citation, presenting on the display, a graphical user interface configured to indicate that the second content item is not available.

16. The method as recited in claim 15, wherein the graphical user interface is further configured to receive a fourth selection, and the method further comprising notifying, based at least in part on the fourth selection, a user associated with the electronic device at a time at which the second content item becomes available.

17. The method as recited in claim 13, wherein the inserting the first citation to the first content item within the electronic document is based at least in part on at least one of settings or preferences of a user of the electronic device.

18. The method as recited in claim 13, wherein the citation data includes an identifier associated with the first content item, and wherein determining the first online source for the first content item comprises locating, via a network interface of the electronic device, one or more online sources using the identifier.

19. The method as recited in claim 13, the method further comprising storing, on the electronic device, at least a portion of the first citation data as one of a tag, a link, or updatable code in the electronic document.

20. An electronic device, comprising:
a display upon which digital content is rendered;
a processor; and
memory containing instructions that, when executed by the processor, cause the processor to perform actions comprising:
receiving first citation data for an electronic document, the first citation data including a first citation associated with a first content item and a placeholder citation relating to a second content item that is not currently available;
storing local citation data on the electronic device based at least partly on the first citation data, the local citation data including the first citation and the placeholder citation, and wherein the local citation data associates the first citation and the placeholder citation with an electronic document file for the electronic document;
determining that the first content item is available from a first online source;
rendering, based at least in part on the local citation data and the electronic document file, the electronic document on the display, the electronic document including the first citation and the placeholder citation, wherein the first citation comprises first information to cause the electronic device, in response to receipt of a first user selection, to initiate a first acquisition of the first content item from the first online source;
receiving second citation data indicating a second online source;
modifying the local citation data such that the placeholder citation includes second information to cause the electronic device, in response to receipt of a second user selection, to initiate a second acquisition of the second content item from the second online source; and rendering, based at least in part on the local citation data, the electronic document on the display of the electronic device, the rendering including inserting a second citation within the electronic document in place of the placeholder citation, the second citation comprising third information to cause the electronic device to, in response to receipt of a user selection, initiate the second acquisition of the second content item from the second online source.

21. The electronic device as recited in claim 20, wherein storing the local citation data on the electronic device comprises storing at least a portion of the first citation data as updatable code in the electronic document file; and
wherein modifying the placeholder citation comprises incorporating the online source of the second content item in the updatable code.

22. The electronic device as recited in claim 20, the actions further comprising:
receiving, by the electronic device, a selection of the placeholder citation; and
based at least in part on the selection of the placeholder citation, presenting on the display, a graphical user interface configured to indicate that the second content item is not available.

23. The electronic device as recited in claim 22, wherein the graphical user interface is further configured to receive an additional selection, and the actions further comprise notifying, based at least in part on the additional selection, a user associated with the electronic device at a time at which the second content item becomes available.

24. The electronic device as recited in claim 20, wherein the inserting the placeholder citation within the electronic document is based at least in part on at least one of settings or preferences of a user of the electronic device.

25. The electronic device as recited in claim 20, wherein the first citation data includes an identifier associated with the first content item, and wherein determining the first online source comprises locating, via a network interface of the electronic device, one or more online sources using the identifier.

26. The electronic device as recited in claim 20, the actions further comprising storing at least a portion of the first citation data as one of a tag, a link, or updatable code in the electronic document.

* * * * *